(12) United States Patent
Kokubo et al.

(10) Patent No.: US 9,896,143 B2
(45) Date of Patent: Feb. 20, 2018

(54) PANNIER MOUNTING STRUCTURE IN SADDLE-RIDING TYPE VEHICLE

(71) Applicant: Kawasaki Jukogyo Kabushiki Kaisha, Kobe-shi, Hyogo (JP)

(72) Inventors: Takahiro Kokubo, Kobe (JP); Hiroyuki Kasugai, Kakogawa (JP); Makoto Miyawaki, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 15/485,007

(22) Filed: Apr. 11, 2017

(65) Prior Publication Data
US 2017/0369115 A1  Dec. 28, 2017

(30) Foreign Application Priority Data
Jun. 27, 2016 (JP) .................................. 2016-126701

(51) Int. Cl.
*B62J 9/00* (2006.01)

(52) U.S. Cl.
CPC . *B62J 9/001* (2013.01); *B62J 9/00* (2013.01)

(58) Field of Classification Search
CPC ................................. B60R 9/00; B60R 9/001
USPC ........................................................ 224/413
See application file for complete search history.

(56) References Cited

U.S. PATENT DOCUMENTS

| | | | | |
|---|---|---|---|---|
| 3,874,574 A * | 4/1975 | Heise | ......................... | B62J 9/00 190/18 R |
| 4,260,084 A * | 4/1981 | Warren, Jr. | ................. | B62J 9/00 224/328 |
| 5,271,540 A * | 12/1993 | Katz | ......................... | B62J 9/00 224/417 |
| 5,667,117 A * | 9/1997 | Nutto | ......................... | A45F 4/02 224/417 |
| 6,053,384 A * | 4/2000 | Bachman | ................... | B62J 7/04 224/413 |
| 6,293,450 B1 * | 9/2001 | Aron | ......................... | B62J 9/001 224/413 |
| 6,499,638 B2 * | 12/2002 | Campbell | ................ | B62J 9/001 190/18 A |
| 6,820,782 B1 * | 11/2004 | Monson | .................... | B62J 9/001 224/413 |

(Continued)

FOREIGN PATENT DOCUMENTS

| | | | | |
|---|---|---|---|---|
| CA | 2763719 A1 * | 7/2013 | ................. | B62J 9/00 |
| CA | 2708813 C * | 8/2013 | .............. | A45C 11/00 |

(Continued)

*Primary Examiner* — Justin Larson

(57) ABSTRACT

In a pannier mounting structure, a pannier is mounted on a side portion in a vehicle widthwise direction of a motorcycle through a pannier stay. The pannier stay includes a first retaining portion and a second retaining portion beneath the first retaining portion. The pannier has a rear surface provided with a first retaining bag that opens downwards and a second retaining bag that is positioned below the first retaining bag and opens upwards. While the first retaining portion is inserted into the first retaining bag through an opening in a lower portion thereof, the second retaining portion is inserted into the second retaining bag through an opening in an upper portion thereof and is engaged within the second retaining bag.

7 Claims, 6 Drawing Sheets

(56) References Cited

U.S. PATENT DOCUMENTS

| | | | | |
|---|---|---|---|---|
| 6,830,169 B1* | 12/2004 | Campbell | ............... | B62J 9/00 |
| | | | | 224/413 |
| 7,207,470 B2* | 4/2007 | Akita | ............... | B62J 9/001 |
| | | | | 224/413 |
| 8,292,139 B2* | 10/2012 | Golub | ............... | B62J 9/001 |
| | | | | 224/419 |
| 8,973,797 B2* | 3/2015 | Langlois | ............... | B62J 9/00 |
| | | | | 224/432 |
| 9,440,696 B2* | 9/2016 | Sakai | ............... | B62J 7/04 |
| 9,604,685 B2* | 3/2017 | Schanz | ............... | B62J 7/04 |
| 9,616,956 B2* | 4/2017 | Aron | ............... | B62J 9/001 |
| 9,650,096 B2* | 5/2017 | Visenzi | ............... | B62J 9/00 |
| 2004/0149792 A1 | 8/2004 | Akita et al. | | |
| 2012/0255983 A1* | 10/2012 | Semone | ............... | A45F 3/04 |
| | | | | 224/585 |
| 2013/0043289 A1* | 2/2013 | Visenzi | ............... | B62J 9/00 |
| | | | | 224/449 |

FOREIGN PATENT DOCUMENTS

| | | | | |
|---|---|---|---|---|
| DE | 102013111159 B4 * | 5/2017 | ............... | B62J 9/00 |
| EP | EP 3121098 A3 * | 2/2017 | ............... | B62J 7/08 |
| JP | 3569687 | 9/2002 | | |
| JP | 5701194 B2 * | 4/2015 | ............... | B62J 9/00 |
| WO | WO 2017032353 A1 * | 3/2017 | ............... | B62J 7/08 |

* cited by examiner

PANNIER MOUNTING STRUCTURE IN SADDLE-RIDING TYPE VEHICLE

CROSS REFERENCE TO THE RELATED APPLICATION

This application is based on and claims Convention priority to Japanese patent application No. 2016-126701, filed Jun. 27, 2016, the entire disclosure of which is herein incorporated by reference as a part of this application.

BACKGROUND OF THE INVENTION

Field of the Invention

The present invention relates to a pannier mounting structure in a saddle-riding type vehicle for mounting a pannier on a side portion of such vehicle by means of a stay.

Description of Related Art

A saddle-riding type vehicle such as, for example, a motorcycle of a kind has been well known in the art, in which a pannier for accommodating goods or articles is mounted on a lateral portion of a vehicle body rear portion via a stay. In this respect, see, for example, the Japanese Patent No. 3569687. In this Japanese patent, the panier includes an inner side surface provided with an engagement and a locking unit, and the stay includes an engagement shaft portion to be engaged with the engagement and a locking part to be engaged with the locking unit. The pannier is fitted in position by engaging the engagement shaft portion of the stay with the engagement of the pannier and then engaging the locking unit of the pannier with the locking part of the stay.

It has, however, been found that the mounting of the pannier requires the use of the engagement and the locking unit on the inner side surface of the pannier, both of which are complicated.

SUMMARY OF THE INVENTION

In view of the above, the present invention has an essential object to provide a pannier mounting structure which is simple in structure enough to allow the pannier to be easily fitted to a vehicle body in a stable fashion.

In order to accomplish the foregoing object of the present invention, there is, in accordance with the present invention, provided a pannier mounting structure for a saddle-riding type vehicle for fitting a pannier to a side portion in a vehicle widthwise direction, the structure comprising: a stay provided in one of the pannier and the vehicle body; and an opposing member provided in the other of the pannier and the vehicle body, the opposing member confronting the stay in the vehicle widthwise direction, in which case: the stay includes a first retaining portion on one side in a first direction and a second retaining portion on the other side in the first direction; the opposing member includes a first inhibiting portion and a second inhibiting portion; the first inhibiting portion is engaged with the first retaining portion of the stay to inhibit a relative movement of the pannier relative to the vehicle body towards the one side in the first direction on a plane crossing the vehicle widthwise direction; the second inhibiting portion is engaged with the second retaining portion of the stay to permit a movement in the first direction but to inhibit the relative movement of the pannier relative to the vehicle body in a second direction transverse to the first direction; and the first inhibiting portion and the second inhibiting portion are disposed spaced from each other in the first direction on the plane crossing the vehicle widthwise direction. In the pannier mounting structure, in a condition in which the relative movement of the pannier in the second direction relative to the vehicle body is inhibited by the second inhibiting portion, and in a condition in which the pannier is moved towards the other side in the first direction relative to the vehicle body, the stay is spaced from the first inhibiting portion in the first direction so as to assume a position adjacent to the second inhibiting portion.

According to the construction hereinabove described, by moving the pannier in the first direction the second retaining portion of the stay has been engaged with the second inhibiting portion of the opposing member, and thereafter, by moving the pannier in the other of the first directions the first retaining portion of the stay is engaged with the first inhibiting portion of the opposing member. By so doing, the pannier can be easily fitted to the vehicle body in a stabilized condition in which the movements of the pannier in the first and second directions are inhibited. Also, since the opposing member is merely provided with the first and second inhibiting portion, the structure is simplified. In addition, since the first inhibiting portion and the second inhibiting portion are so disposed as to be spaced a distance in the first direction, an undesirable increase of the vehicle widthwise direction dimension of the saddle-riding type vehicle can be suppressed. As a result, the pannier will not constitute an obstruction during the travelling and the aesthetic appearance will not be lowered.

In a preferred embodiment of the present invention, the first inhibiting portion may inhibit downward movement of the pannier relative to the vehicle body whereas the second inhibiting portion may inhibit movement of the pannier relative to the vehicle body in a longitudinal direction of the vehicle body, and at least one of the first inhibiting portion and the second inhibiting portion may include a covering portion covering the stay from the vehicle widthwise direction, which covering portion regulates movement of the pannier in the vehicle widthwise direction relative to the stay. In such case, the second inhibiting portion may be, in a condition in which the relative movement of the pannier in the longitudinal direction relative to the vehicle body is inhibited, so configured as to permit the pannier to be relatively movable in a direction upwardly relative to the vehicle body and, in a condition in which the pannier is moved to an uppermost end relative to the vehicle body, the stay and the first inhibiting portion are spaced from each other in a vertical direction.

According to the construction hereinabove described, while the movements of the pannier in the vertical direction, the longitudinal direction of the vehicle body and the vehicle widthwise direction are inhibited, the pannier can be fitted. Also, since the pannier does not move downwards, an undesirable fall of the pannier can be avoided. In addition, since the downward movement of the pannier is inhibited, the pannier during the mounting can be temporarily retained by the stay. Therefore, even under the circumstances in which the pannier mounting work is loaded such as with a heavy goods accommodated in the pannier, the pannier can be easily fitted. Moreover, since the second inhibiting portion inhibits the movement of the pannier in the longitudinal direction of the vehicle body, the movement of the pannier in the vertical direction may be easy to facilitate the mounting of the pannier. Yet, since the pannier covers the stay and the opposing member from the vehicle widthwise direction, the stay and the opposing member are hardly viewed from the lateral side, thereby avoiding the lowering of the aesthetic appearance. Therefore, the degree of freedom in designing the stay and the opposing member can be increased. In particularly, since the outer side surface of the pannier when viewed from lateral side is exposed, the degree of freedom in setting the design can be increased when the pannier is formed as a design component.

In a further preferred embodiment of the present invention, the opposing member may include one side surface, facing the vehicle widthwise direction, provided with a first retaining bag and a second retaining bag positioned on the other of the first direction of the first retaining bag, which first retaining bag opens in the other side of the first direction and form the first inhibiting portion, which second retaining bag opens in the one side of the first direction and forms the second inhibiting portion. In this structure, in a condition in which the first retaining portion may be inserted into the first retaining bag through an opening on the other side of the first direction, the second retaining portion may be inserted into the second retaining bag through an opening on the one side of the first direction and may be then engaged within the second retaining bag.

According to the construction described above, since insertion of the first and second retaining portions into the respective first and second retaining bags is sufficient, the mounting of the pannier is simple. Also, since due to the two first and second retaining bags the pannier is fixed over the entire side surface of the opposing member, the support of the pannier is stabilized. In addition, since the first and second inhibiting portions are each formed to represent a bag-like configuration, it is easy to manufacture the first and second inhibiting portions, and also rattling of the first and second retaining portions can be easily absorbed and the degree of freedom in designing can also be increased.

Where the stay includes the first retaining portion and the second retaining portion and the first retaining bag and the second retaining bag are provided in the opposing member, the second retaining portion may be displaced in the second direction relative to the first retaining portion, in which case the second retaining bag may be displaced in the second direction relative to the first retaining bag. The wording "(to be) displaced in the second direction" referred to above and hereinafter is intended to mean that a center line of the second direction of the first retaining portion (first retaining bag) and a center line of the second direction of the second retaining portion (second retaining bag) is displaced in the second direction. According to the foregoing construction, since the right side stay can accommodate only the right side pannier, an erroneous mix-up of the left and right side panniers can be avoided.

Where the stay includes the first retaining portion and the second retaining portion and the first retaining bag and the second retaining bag are provided in the opposing member, a belt may be employed to fasten the first and second retaining portions from the first direction during a condition in which the first and second retaining portions are inserted in the first and second retaining bags, respectively. According to this construction, the movement of the pannier in the first direction can be regulated.

According to another aspect of the present invention, the saddle-riding type vehicle is provided with the pannier mounting structure as defined in accordance with the present invention. According to the construction described above, with a simplified structure, the pannier can be easily fitted while the movements in the two directions are inhibited. In particular, although the motorcycle, which is one kind of the saddle-riding type vehicle, has a slim feature that the vehicle widthwise direction dimension thereof is small, according to the pannier mounting structure of the present invention, since an undesirable increase of the vehicle widthwise direction dimension can be suppressed, any change in appearance can be minimized even when the pannier is mounted. Also, with the increase of the vehicle widthwise direction dimension being suppressed, the pannier will hardly displace from the center of gravity of the vehicle and, hence, the stability during the travelling can be easily maintained even when a heavy load is accommodated within the pannier.

Also, according to a further aspect of the present invention, there is provided a pannier for a saddle-riding type vehicle, which pannier is fitted to a side portion in a vehicle widthwise direction of the saddle-riding type vehicle through a stay, which stay includes a first retaining portion on one side in a first direction and a second retaining portion on the other side in the first direction, and the pannier includes one side surface, facing the vehicle widthwise direction, provided with an opposing member which confronts the stay. The opposing member includes a first inhibiting portion and a second inhibiting portion; the first inhibiting portion is engaged with the first retaining portion of the stay to inhibit a relative movement of the pannier relative to the vehicle body towards the one side in the first direction on a plane crossing the vehicle widthwise direction; the second inhibiting portion is engaged with the second retaining portion of the stay to permit a movement in the first direction but to inhibit the relative movement of the pannier relative to the vehicle body in a second direction transverse to the first direction; and the first inhibiting portion and the second inhibiting portion are disposed spaced from each other in the first direction on the plane crossing the vehicle widthwise direction. In the pannier mounting structure, in a condition in which the relative movement of the pannier in the second direction relative to the vehicle body is inhibited by the second inhibiting portion, and in a condition in which the pannier is moved towards the other side in the first direction relative to the vehicle body, the stay is spaced from the first inhibiting portion in the first direction so as to assume a position adjacent to the second inhibiting portion.

According to the construction descried above, by moving the pannier in the first direction the second retaining portion of the stay has been engaged with the second inhibiting portion of the opposing member, and thereafter, by moving the pannier in the other of the first directions the first retaining portion of the stay is engaged with the first inhibiting portion of the opposing member. By so doing, the pannier can be easily fitted to the vehicle body in a stabilized condition in which the movements of the pannier in the first and second directions are inhibited. Also, since the opposing member is merely provided with the first and second inhibiting portion, the structure is simplified.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF PREFERRED EMBODIMENTS

Hereinafter, the details of a preferred embodiment of the present invention will be described. In describing the present invention, however, the terms "left" and "right" used hereinabove and hereinafter are to be understood as relative terms each descriptive of position and/or direction as viewed from a driver maneuvering a motorcycle.

Figure 1:
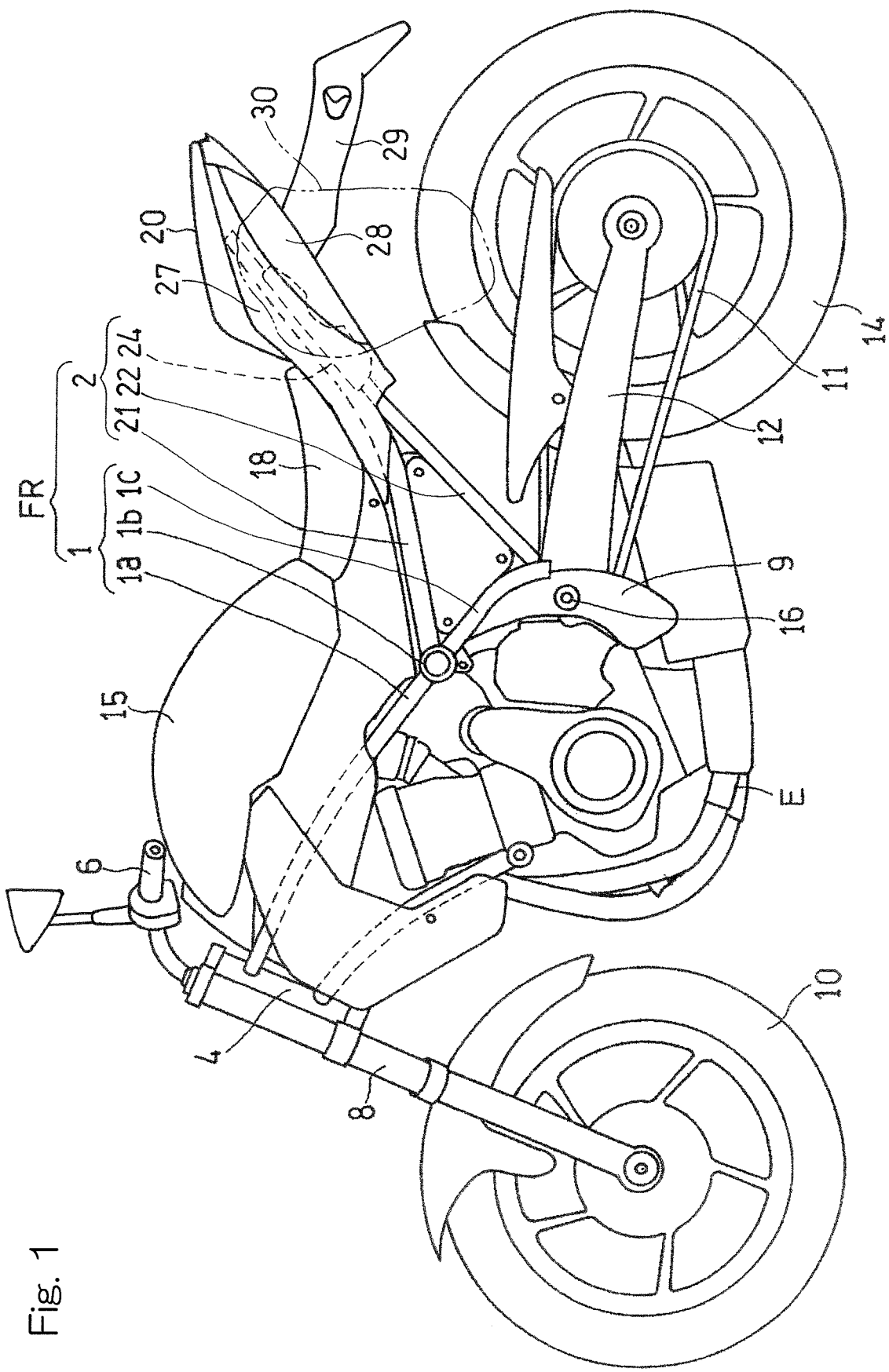
FIG. 1 is a schematic side view showing a motorcycle, which is a kind of saddle-riding type vehicles, and which is equipped with a pannier mounting structure in accordance with a preferred embodiment of the present invention.
Figure 2:
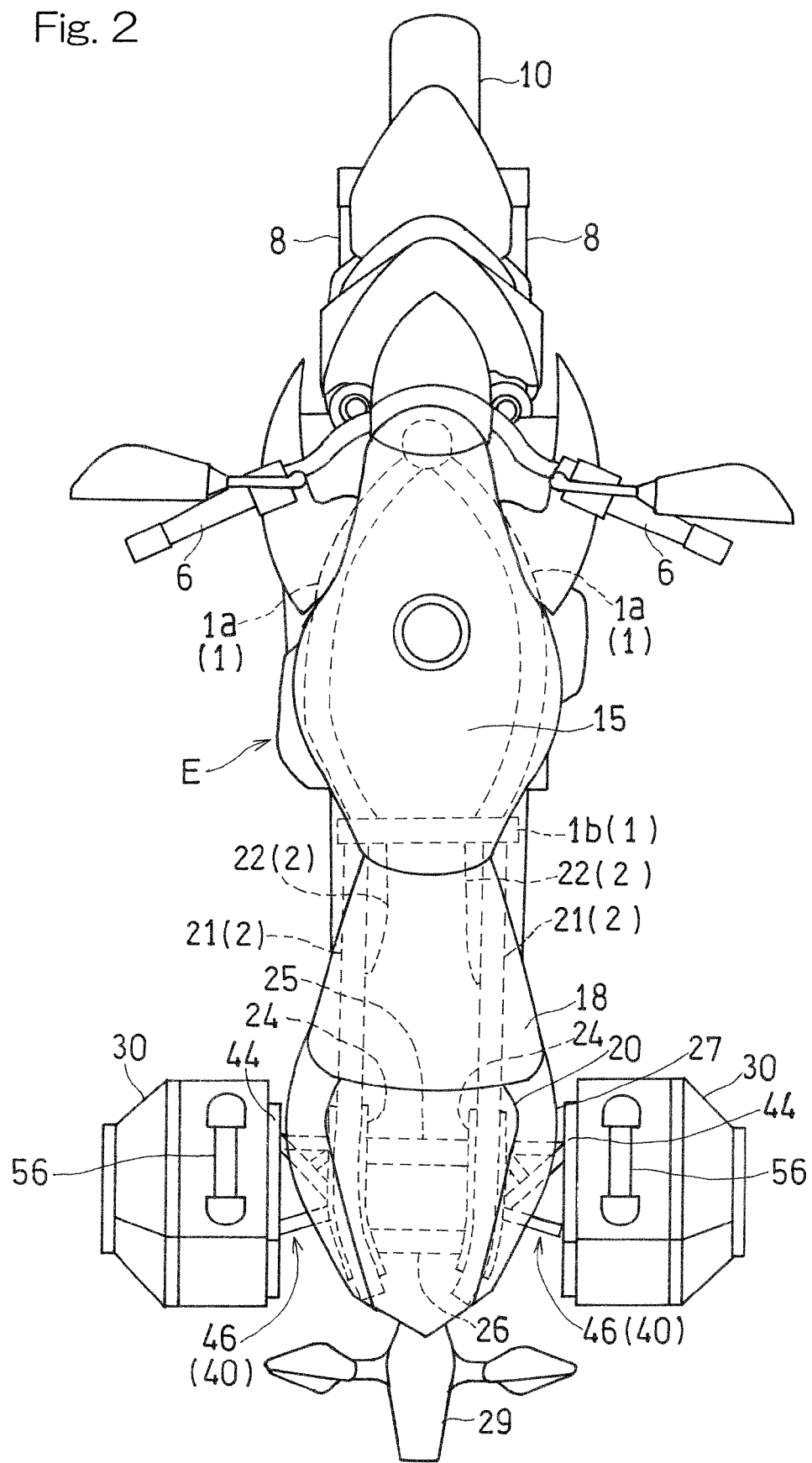
FIG. 2 is a schematic top plan view of the motorcycle shown in FIG. 1.

FIG. 1 shows a side view of the motorcycle equipped with a pannier mounting structure designed in accordance with a preferred embodiment of the present invention. It is to be noted that FIG. 1 illustrates the motorcycle in a condition in which the pannier has not yet been mounted and, instead, the presence of the pannier 30 on each side of the motorcycle is shown by the double dotted line. FIG. 2 illustrates a schematic top plan view of the motorcycle with the left and right panniers 30 mounted on respective side portion of the motorcycle. As shown in FIG. 2, the motorcycle is of a slim design having a small dimension in a motorcycle widthwise direction and this slim design feature will not change even though the panniers 30 are mounted on the motorcycle. A frame structure FR of the motorcycle includes a main frame 1 forming a part of a front half subframe structure and a rear frame 2 forming a part of a rear half subframe structure. The main frame 1 includes a front side main frame piece 1a that extends slantwise rearwardly and downwardly from a head pipe 4 that is provided at a front end thereof.

As shown in FIG. 2, the front side main frame piece 1a is provided in a pair, one on each of the left and right sides of the motorcycle, and respective rear end portions of the left and right front side main frame pieces 1a and 1a are connected together by means of a first cross member 1b that extends in a motorcycle widthwise direction. The main frame 1 also includes a rear side main frame piece 1c extending slantwise rearwardly and downwardly from the first cross member 1b as shown in FIG. 1. The rear side main frame piece 1c is provided in a pair, one on each of the left and right sides of the motorcycle. Accordingly, the main frame 1 is comprises of the left and right front side main frame pieces 1a and 1a, the first cross member 1b, and the left and right rear side main frame piece 1c and 1c.

The rear frame 2 includes a seat rail 21, which extends rearwardly from the first cross member 1b, and a reinforcement rail 22 positioned below the seat rail 21. The reinforcement rail 22 has its front end connected with a rear end portion of the rear side main frame 1c, and extends from this front end towards the seat rail 21 in a direction rearwardly and slantwise upwardly. The seat rail 21 has a rear portion provided with a gusset 24 which is a reinforcement member and protrudes downwardly from the seat rail 21. The gusset 24 is fixedly secured to the seat rail 21 by means of welding. The reinforcement rail 22 is a straight pipe member having a rear end face 22a thereof welded to the gusset 24.

As shown in FIG. 2, each of the seat rail 21, the reinforcement rail 22 and the gusset 24 is employed in one pair on left and right sides. A second cross member 25 for connecting the left and right seat rails 21 and 22 together is provided on an upper portion of an intermediate portion, in a front-rear direction or a longitudinal direction of the motorcycle, of the seat rail 21. This second cross member 25 is connected with the left and right seat rails 21 and 21 by means of welding. Also, a third cross member 26, which connects the left and right gussets 24 and 24 together, is provided rearwardly of the second cross member 25. This third cross member 26 is connected with respective undersurface of the left and right gussets 24 and 24 by the use of bolts.

As described above, the rear frame 2 is constituted by the left and right seat rails 21 and 21, the left and right reinforcement rails 22 and 22, the left and right gussets 24 and 24, the second cross member 25 and the third cross member 26.

A front fork 8 is rotatably supported by the head pipe 4, shown in FIG. 1, through a steering shaft (not shown). The front fork 8 has an upper end portion on which a steering handlebar 6 is fixed, and also has a lower end portion to which a front wheel 10 is fitted.

The rear side main frame piece 1c of the main frame 1 is provided with a swingarm bracket 9. A swingarm 12 is supported for pivotal movement up and down about a pivot pin 16 that is fitted to the swingarm bracket 9. The swingarm 12 has a rear end portion by which a rear wheel 14 is rotatably supported. A combustion engine E is fitted to a front side of the swingarm bracket 9 at a location below the front side main frame piece 1a of the main frame 1. This combustion engine E drives the rear wheel 14 through a drive transmission member 11 such as, for example, a substantially endless chain.

A fuel tank 15 is disposed atop the front side main frame piece 1a of the main frame 1, and a rider's seat 18 and a fellow passenger's seat 20 are supported by the seat rail 21 of the rear frame 2. Specifically, the fellow passenger's seat 20 is supported by the second cross member 25 and the seat rail 21.

A pair of left and right rear cowls or fairing 27 are disposed on a rear portion of the rear frame 2 so as to cover a region below a rear portion of the rider's seat 18 and, also, a region below the fellow passenger's seat 20 from lateral outer sides. A rear fender 28 is disposed in a lower portion of the rear cowl 27 above the rear wheel 14 and is supported by the rear frame 2. A rear flap 29 is fitted to a lower portion of the rear fender 28. Specifically, the rear portion of the rear fender 28 and the rear flap 29 are supported by the third cross member 26.

Figure 3:
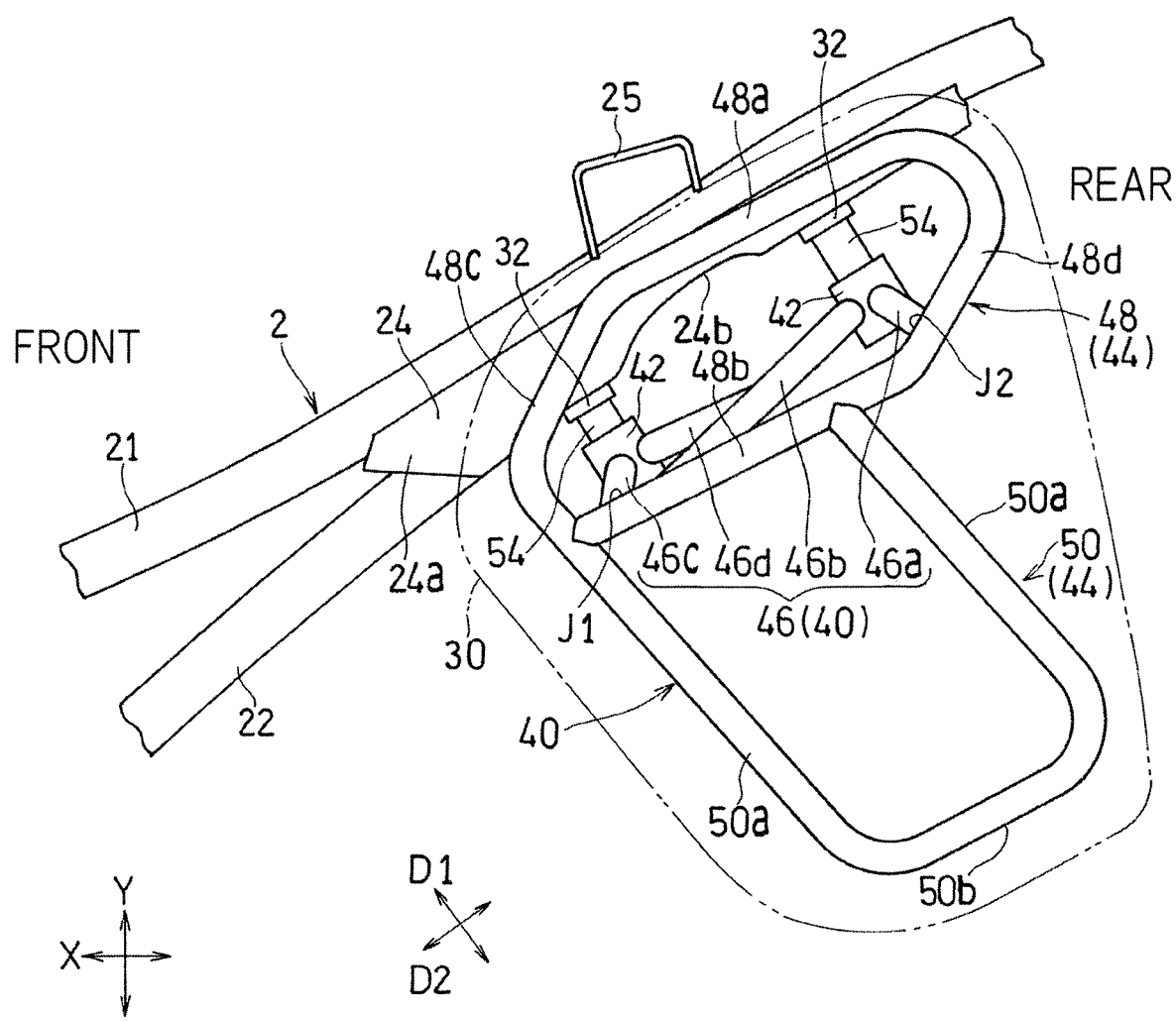
FIG. 3 is a side view showing the manner in which a pannier stay is fitted to a rear frame of the motorcycle.

The gusset 24 shown in FIG. 3 is of an elongated shape extending in a lengthwise direction of the seat rail 21. This gusset 24 is formed by bending a sheet metal and has an U-shaped transverse section having its opening oriented upwardly. The U-shaped gusset 24 includes a pair of left and right upstanding walls 24a and 24a and a bottom wall 24b connecting those upstanding walls 24a and 24a together. Each of the upstanding walls 24a of the gusset 24 has an upper end portion jointed to opposite side portions of the seat rail 21.

Figure 4:
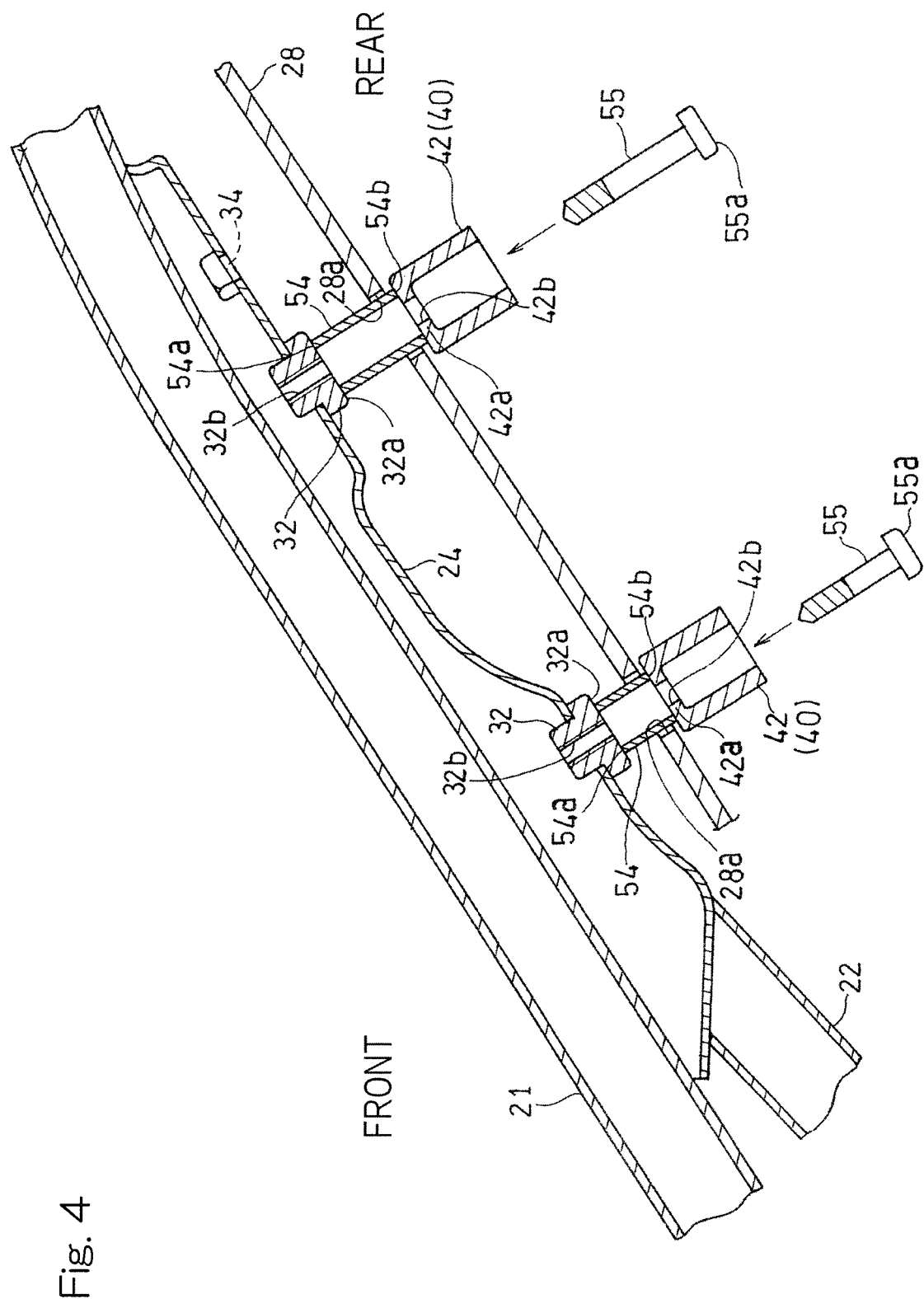
FIG. 4 is a schematic longitudinal sectional view showing the manner in which the pannier stay is fitted to a motorcycle body.

The bottom wall 24b of the gusset 24 has an undersurface provided with a mounting member 32 for pannier fixture. In the practice of the preferred embodiment of the present invention, the mounting member 32 is in the form of a welded nut and is provided two in number in a juxtaposed fashion lined up in each of the gussets 24 in the longitudinal direction of the motorcycle. The bottom wall 24b of the gusset 24 is formed with a screw hole 34 as shown in FIG. 4. The screw hole 34 employed in the practice of this preferred embodiment is constituted by a welded nut secured to an upper surface of the bottom wall 24. With the use of this screw hole 34, the third cross member 26 shown in FIG. 2 is bolted to the gusset 24.

At respective positions corresponding to the mounting members 32 in the rear fender 28, a fender throughhole 28a is formed. In a condition in which no accessory component such as, for example, a pannier stay as will be discussed later has not been fitted, each of the fender throughholes 28a is closed by a corresponding cap (not shown).

FIG. 3 illustrates the manner in which the pannier 30 is mounted on the rear frame 2. The pannier 30 is a bag for accommodating goods or articles and is fitted through a pannier stay 40 to each of the opposite side areas of the rear frame rear portions forming the vehicle rear portion. The pannier 30 shown as employed in the preferred embodiment of the present invention is in the form of a soft casing. The term "soft casing" referred to above and hereinafter is intended to mean a casing made of a material such as, for example, clothing or leather, having a flexibility of a kind capable of permitting the casing to be easily deformed by hand.

The left and right pannier stays 40 are of a left-right symmetrical configuration with respect to a vehicle body center line extending in the longitudinal direction of the motorcycle. Accordingly, in the description of the preferred embodiment that follows, reference is made only to the left side pannier stay 40 for the sake of brevity. The pannier stay 40 includes: a to-be-supported portion 42 that is supported by the vehicle body; a pannier mounting portion 44 to which the pannier 30 is fitted; and a connecting portion 46 for connecting the to-be-supported portion 42 and the pannier mounting portion 44 with each other. The to-be-supported portion 42, the pannier mounting portion 44 and the connecting portion 46 are all in the form of a pipe member made of steel material and are united together by means of welding.

As shown in FIG. 4, the to-be-supported portion 42 is in the form of a blind cylindrical pipe open downwardly and is provided in a pair in a fashion juxtaposed in the longitudinal direction of the motorcycle. Each of the to-be-supported portions 42 has a bottom portion 42a formed with a bolt insertion hole 42b.

The pannier mounting portion 44 shown in FIG. 3 is constituted by connecting a plurality of pipe members together by welding so that two closed rectangular rings can be lined one above the other. In other words, the pannier mounting portion 44 includes a first retaining portion 48 of a transversely laid rectangular shape and a second retaining portion 50 of a longitudinally elongated U-shaped configuration positioned below the first retaining portion 48. Specifically, the second retaining portion 50 is of such a shape that opens upwardly with two branch portions 50a and 50a continued at upper ends thereof to a lower hem 48b of the first retaining portion 48. Accordingly, a substantially rectangular ring, which is defined by four hems of the rectangular first retaining portion 48, and a rectangular ring, which is defined by the lower hem 48b of the first retaining portion 48 and the U-shaped second retaining portion 50, are thus formed.

The first retaining portion 48 includes an upper hem 48a extending along the seat rail 21, the lower hem 48b extending below the upper hem 48a in parallel relation to the upper hem 48a, a front hem 48c connecting a front end of the upper hem 48a and a front end of the lower hem 48b together, and a rear hem 48d connecting a rear end of the upper hem 48a and a rear end of the lower hem 48b together. The front hem 48c and the rear hem 48d have their major portions extending inclined upwardly towards the rear. The front hem 48c and the rear hem 48d extend substantially parallel to each other. In other words, in the practice of the preferred embodiment of the present invention, the first retaining portion 48 is of a parallelogram shape. It is, however, to be noted that the shape of the first retaining portion 48 may not be necessarily limited to the parallelogram shape. Four corner portion of the quadrate shape are rounded.

The second retaining portion 50 is of such a shape that two U-shaped branch portions 50a and 50a are laid so as to extend substantially in the vertical direction with lower ends of those branch portions 50a connected together by means of a base portion 50b that extends substantially in the longitudinal direction of the motorcycle. The two branch portions 50a and 50a are parallel to each other, and the base portion 50b is parallel to the lower hem 48b of the first retaining portion 48. In other words, the quadrate shape defined by the lower hem 48b of the first retaining portion 48 and the U-shaped second retaining portion 50 does also represent a parallelogram shape. The front side branch portion 50a has an upper end connected with a front end of the lower hem 48b of the first retaining portion 48. The rear side branch portion 50a has an upper end connected with a rear portion of the lower hem 48b of the first retaining portion 48. In other words, the lower hem 48b of the first retaining portion 48 has a length that is somewhat longer than that of the base portion 50b of the second retaining portion 50.

As FIG. 2 makes it clear, the connecting portion 46 is, after having extended from the to-be-supported portion 42 in a direction outwardly of the vehicle widthwise direction, connected with the first retaining portion 48 of the pannier mounting portion 44. In other words, the pannier mounting portion 44 is disposed having been spaced a distance from the vehicle body in the direction outwardly of the vehicle widthwise direction and is supported by the to-be-supported portion 42 through the connecting portion 46.

More specifically, the connecting portion 46 includes: a first connecting portion 46a extending from the rear side to-be-supported portion 42 shown in FIG. 3 in a direction outwardly of the vehicle widthwise direction and subsequently connected with the rear hem 48d of the first retaining portion 48; a second connecting portion 46b extending from the rear side to-be-supported portion 42 in a direction slantwise forwardly and outwardly of the vehicle widthwise direction and subsequently connected with the lower hem 48b of the first retaining portion 48; a third connecting portion 46c extending from the front side to-be-supported portion 42 in a direction outwardly of the vehicle widthwise direction and subsequently connected with a front end portion of the lower hem 48b of the first retaining portion 48; and a fourth connecting portion 46d extending from the front side to-be-supported portion 42 in a direction slantwise rearwardly and outwardly of the vehicle widthwise direction and subsequently connected with the second connecting portion 46b. As described above, in the practice of this preferred embodiment of the present invention, the connecting portion 46 is used four in number in a fashion juxtaposed in the longitudinal direction of the motorcycle. It is, however, to be noted that the number of the connecting portions 46 may not be necessarily limited to that described above.

The distance, in the longitudinal direction of the motorcycle, between the foremost third connecting portion 46c and the rearmost first connecting portion 46a, that is, the front-rear direction distance between a joint J1, which is defined between the third connecting portion 46c and the first retaining portion 48, and a joint J2, which is defined between the first connecting portion 46a and the first retaining portion 48, is larger than the length of a lower end of the pannier stay 40, that is, longer than that of the base portion 50b of the second retaining portion 50. Accordingly, support of the pannier mounting portion 44 can be stabilized.

In the description that follows, a mounting structure of the pannier stay 40 will now be described. At the outset, a cap (not shown) is removed from the rear fender 28 shown in FIG. 4. Then, a tubular first collar 54 is inserted into the front side fender throughhole 28a so that one end face (an upper end face) 54a of the collar 54 can be brought into contact with an end face 32a of the front side mounting member 32. Subsequently, while the bottom portion 42a of the front side to-be-supported portion 42 of the pannier stay 40 is held in contact with the other end face (a lower end face) 54b of the first collar 54, a bolt 55 is sequentially passed from below through the bolt insertion hole 42b and then through the interior of the first collar 54 and is finally fastened into the screw hole 32b of the front side mounting member 32. In other words, the bottom portion 42a of the to-be-supported portion 42 and the first collar 54 are sandwiched between a head portion 55a of the bolt 55 and the mounting member 32, and are hence connected together by the effect of the fastening force exerted by the bolt 55. By so doing, a front portion of the pannier stay 40 is supported by the rear frame 2.

In a manner similar to the above described procedures, the bolt 55 is fastened to the rear side mounting member 32. By so doing, a rear portion of the pannier stay 40 is supported by the rear frame 2. In the manner described hereinabove, the pannier stay 40 is thus fitted and fixed to the rear frame 2.

Figure 5:
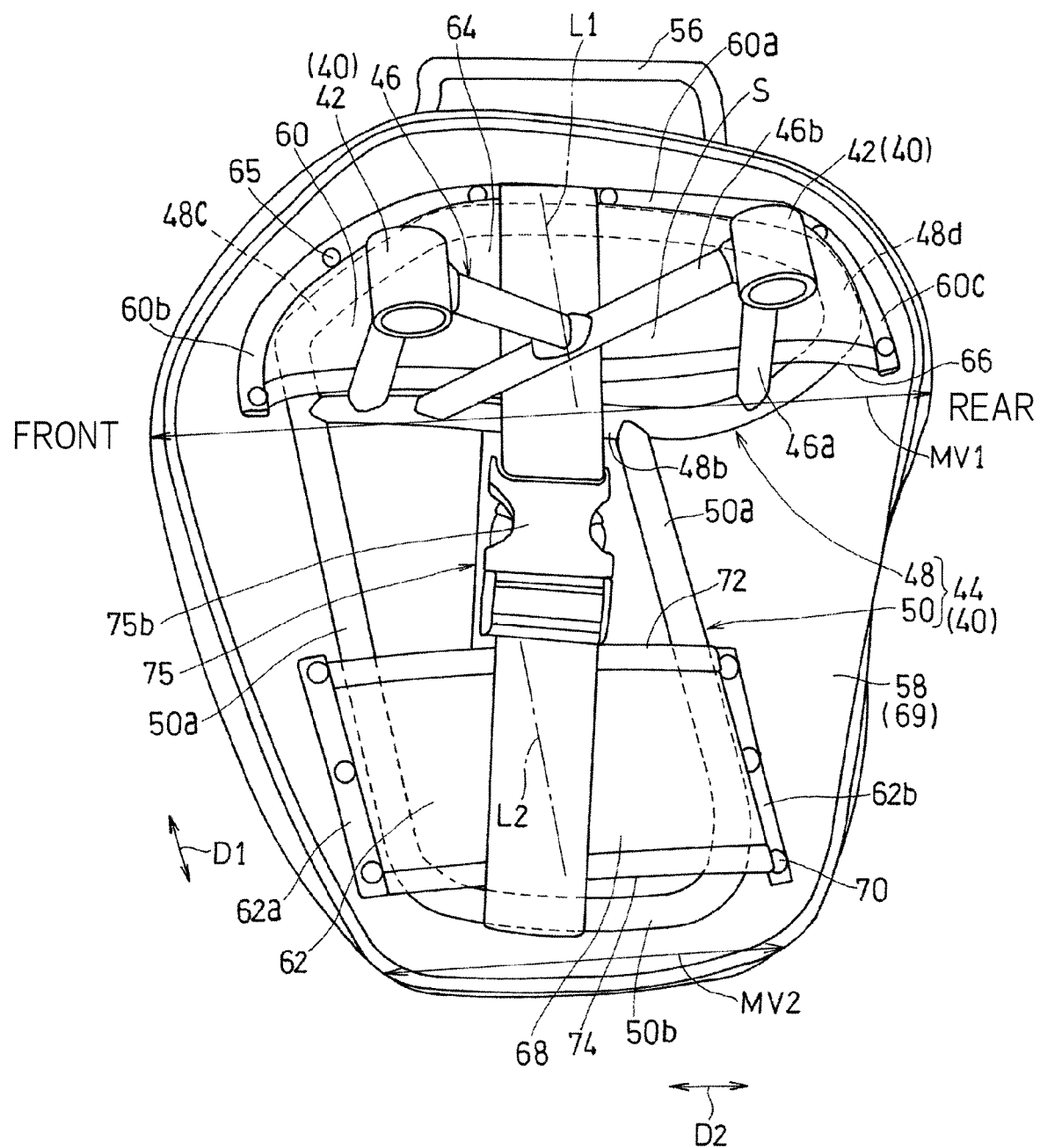
FIG. 5 is a schematic back view showing the pannier and the pannier stay as viewed in a direction inwardly of a motorcycle widthwise direction.

FIG. 5 illustrates a back view showing the pannier 30 as viewed in a direction inwardly of the vehicle widthwise direction. The left and right panniers 30 are also of a left-right symmetrical configuration with respect to the vehicle body center line. Accordingly, in the description of the preferred embodiment that follows, reference is made only to the right side pannier 30 for the sake of brevity. The pannier 30 is of such a shape that, when viewed from laterally side, the front-rear direction dimension thereof gradually increases from an upper end down to a lower portion, with the front-rear direction dimension attaining the maximum value MV1 at an upper portion thereof. From this upper portion the front-rear direction dimension of the pannier 30 gradually decreases in a direction downwardly, with the front-rear direction dimension attaining the minimum value MV2 at a lower end thereof.

A zipper or fastener (not shown) is provided in an upper surface of the pannier 30 and, accordingly, by opening the zipper, goods can be inserted into or removed from the pannier 30. Also, the upper surface of the pannier 30 has a handle 56 fitted thereto for the convenience of carrying the pannier 30.

A back surface of the pannier 30, that is, an inner side surface 58 with respect to the vehicle widthwise direction is provided with a first retaining bag 60, which opens downwardly, and a second retaining bag 62 which is positioned below the first retaining bag 60 and opens upwardly. More specifically, the first retaining bag 60 is of a pocket-like configuration having an opening 66 defined in a lower portion thereof, which bag 60 is formed by fitting a flexible sheet-like first covering member 64 to the back surface 58 with the use of a plurality of fitting pieces 65. In other words, the first retaining bag 60 opens only in a downward direction and does not open upwardly and in the front-rear direction. This first retaining bag 60 is so provided that the opening 66 at the lower portion thereof may be positioned at a position, or in the vicinity of such position, where the front-rear direction dimension of the upper portion of the pannier 30 attains the maximum value MV1.

The second retaining bag 62 is of a parallelogram shape having openings 72 and 74 defined in an upper portion and a lower portion, which bag 62 is formed by fitting a flexible sheet-like second covering member 68 to the back surface 58 of the pannier 30 with the use of a plurality of fitting pieces 70. In other words, the second retaining bag 62 opens upwardly and also downwardly and has no opening in the front-rear direction. This second retaining bag 62 is so provided having been spaced from the first retaining bag 60 in a downward direction, which is one of the vertical direction, with the opening 74 in the lower portion positioned in the vicinity of (somewhat upwardly of) a lower end at which the front-rear direction dimension of the pannier 30 attains the minimum value MV2.

In a condition with the pannier 30 mounted on the pannier stay 40, the first retaining portion 48 of the pannier stay 40 is inserted into and tied up in the first retaining bag 60. In this condition, the first retaining bag 48 is brought into contact with the upper bottom 60a of the pocket-like first retaining bag 60 and, therefore, movement of the pannier 30 in the downward direction relative to the pannier stay 40 can be inhibited. In other words, the first retaining bag 60 forms a first inhibiting portion by which the downward movement of the pannier 30 relative to the pannier stay 40 (vehicle body) can be inhibited.

In the preferred embodiment now under discussion, the first retaining bag 60 (first inhibiting portion) inhibits the downward movement of the pannier 30 relative to the pannier stay 40 (vehicle body), but attention is drawn that the first inhibiting portion may be anything that inhibits the relative movement of the pannier 30 relative to the vehicle body in one of first directions D1 on the plane transverse to the vehicle widthwise direction. In the practice of the preferred embodiment, the movement in one of the vertical direction, which is a first direction D1, that is, in a downward direction is inhibited as described hereinabove.

On the other hand, the second retaining bag 62 is tied up with the second retaining portion 50 of the pannier stay 40 having been passed therethrough. In this condition, the second retaining portion 50 is brought into the vicinity of the front wall 62a and the rear wall 62b of the second retaining bag 62 and, therefore, movement of the pannier 30 in the longitudinal direction of the motorcycle relative to the pannier stay 40 can be inhibited. The second retaining bag 62 thus forms a second inhibiting portion for inhibiting the movement of the pannier 30 in the longitudinal direction of the motorcycle relative to the pannier stay 40 (vehicle body).

It is, however, to be noted that since the second retaining bag (second inhibiting portion 62) is of the parallelogram shape with the openings 72 and 74 defined in the upper portion and the lower portion, the front wall 62a and the rear wall 62b thereof lie parallel to the branch portions 50a and 50b of the second retaining portion 50 and, hence, the movement in the first direction (substantially vertical direction) D1 parallel to the branch portion 50a of the second retaining portion 50 of the pannier 30 is permitted.

In the practice of the preferred embodiment now under discussion, the second retaining bag 62 (second inhibiting portion) inhibits movement of the pannier 30 in the longitudinal direction of the motorcycle relative to the pannier stay 40 (vehicle body), but attention is drawn that the second inhibiting portion may be anything that inhibits the relative movement in the second direction D2, which lies at right angles to the first direction D1, while permitting the movement of the pannier 30 in the first direction D1 relative to the pannier stay 40 (vehicle body). In such case, the first inhibiting portion and the second inhibiting portion are so disposed as to be spaced in the first direction D1 on the plane that intersects the vehicle widthwise direction. In the preferred embodiment now under discussion, as discussed above, the movement in the vertical direction or the first direction D1 is permitted, but the movement in the substantially longitudinal direction of the motorcycle or the second direction D2 is inhibited.

As shown in FIG. 3, in the present embodiment, in a condition with the pannier stay 40 and the pannier 30 having been fitted to the vehicle body, the first direction D1 and the second direction D2 do not coincide with the vertical direction Y of the vehicle body and the longitudinal direction X of the motorcycle, respectively and are somewhat inclined. Hence, with those direction inclined as discussed above, any positional displacement of the pannier 30 brought about by up and down vibrations of the vehicle body can be easily prevented. It is, however, to be noted that the first direction D1 and the second direction D2 may be completely coincided with the vertical direction and the longitudinal direction of the motorcycle, respectively. In the description made herein, the first direction D1 is referred to as the vertical direction, and the second direction D2 is referred to as the longitudinal direction of the motorcycle for the sake of brevity.

The second retaining portion 50 shown in FIG. 5 is displaced in the longitudinal direction of the motorcycle or the second direction D2 relative to the first retaining portion 48, whereas the second retaining bag 62 is displaced in the longitudinal direction of the motorcycle relative to the first retaining bag 60. The wording "(to be) displaced in the longitudinal direction of the motorcycle" referred to above and hereinafter is intended to mean that a center line L1, in the longitudinal direction D2, of the first retaining portion 48 and the first retaining bag 60 and a center line L2, in the longitudinal direction D2, of the second retaining portion 50 and the second retaining bag 62 are displaced in the longitudinal direction D2.

As described hereinabove, the back surface 58 of the pannier 30 is provided with the first inhibiting portion 60 and the second inhibiting portion 62. In other words, the back surface 58 of the pannier 30 forms an opposing member 69 which faces the pannier stay 40 in the vehicle widthwise direction and is provided with the first inhibiting portion 60 and the second inhibiting portion 62. Hence, the back surface 58 of the pannier 30 is formed by a core material having a high rigidity as compared with that of any other portion of the pannier 30. Therefore, an undesirable deformation of the pannier 30 during mounting is prevented and a support condition can be easily retained. For the core material, a flat plate made of a resinous material, for example, is used. It is to be noted that in the practice of this preferred embodiment, although the back surface 58 of the pannier 30 has been shown and described as forming the opposing member 69, an alternative arrangement is possible in which an opposing member 69, which is a member separate from the pannier 30, may be used and fitted to the back surface 58 of the pannier 30.

Figure 6:
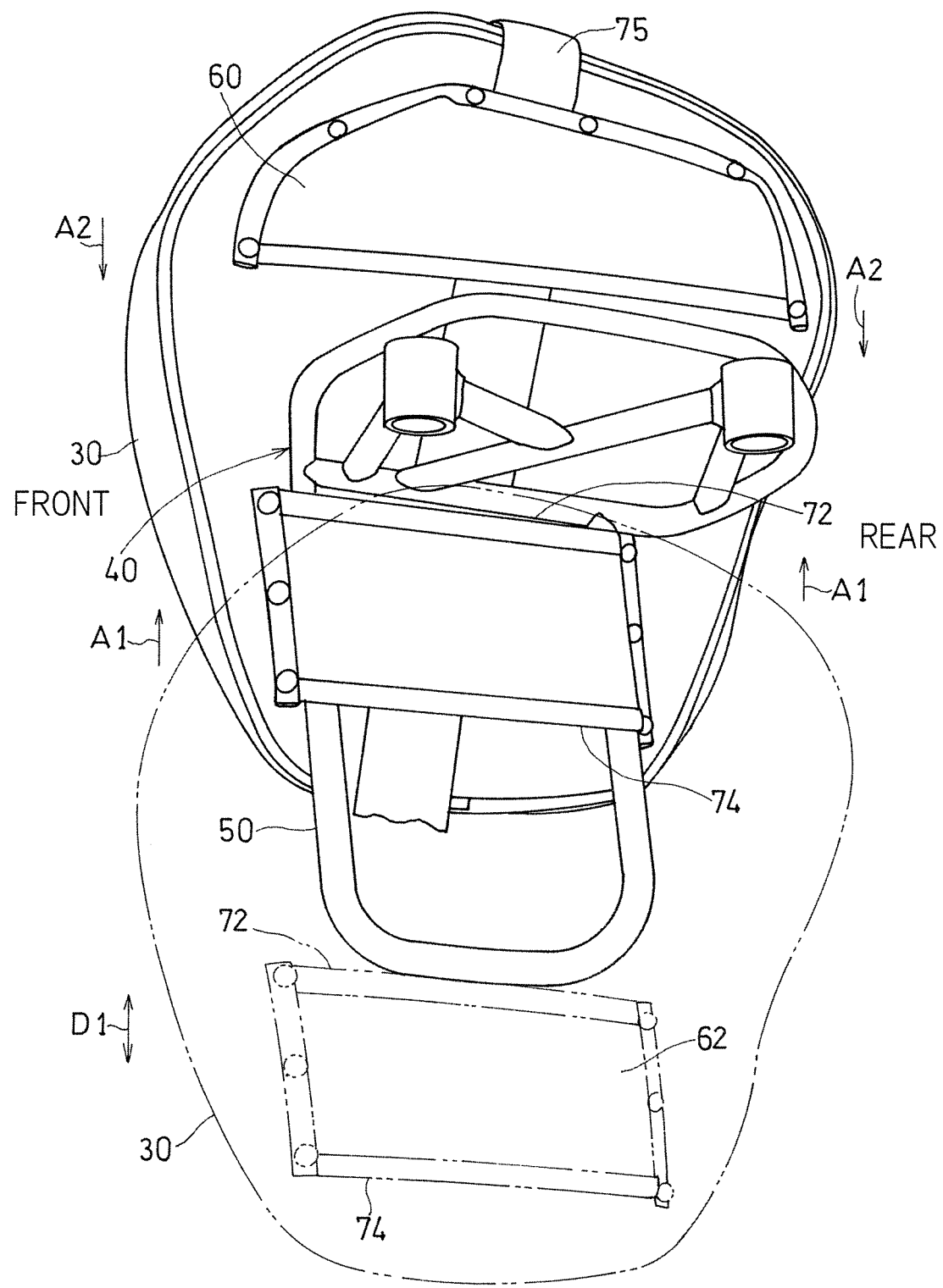
FIG. 6 is a schematic back view showing the sequence of fitting of the pannier to the pannier stay.

In a condition with the second retaining portion 50 of the pannier stay 40 inserted into the second retaining bag 62 through the opening 72 in the upper portion, the first retaining portion 48 is inserted into the first retaining bag 60 through the opening 66 in the lower portion and is then tied up within the first retaining bag 60. The second retaining bag 62 is so configured as to permit the pannier 30 to be movable relatively in the vertical direction relative to the vehicle body while the relative movement of the pannier 30 relative to the vehicle body in the longitudinal direction D2 is inhibited (in the condition shown in FIG. 6) and, also, as to permit the pannier stay 40 and the first retaining bag 60 to be spaced in the vertical direction while the pannier 30 has moved to the uppermost end relative to the vehicle body.

In other words, it is so configured that while the relative movement of the pannier 30 in the longitudinal direction D2 relative to the vehicle body is inhibited by the second retaining bag 62 and, at the same time, the pannier 30 is relatively moved in the other of the first direction D1, that is, upwardly relative to the vehicle body, the pannier stay 40 can assume a position adjacent to the second retaining bag 62 in a fashion spaced from the first retaining bag 60 in the vertical direction D1.

Also, the first retaining portion 48 of the pannier stay 40 is covered by the first covering member 64 of the first retaining bag 60 from the vehicle widthwise direction, and the second retaining portion 50 of the pannier stay 40 is covered by the second covering member 68 of the second retaining bag 62 from the vehicle widthwise direction. Accordingly, the movement of the pannier 30 in the vehicle widthwise direction relative to the pannier stay 40 is regulated. In other words, the first covering member 64 and the second covering member 68 form a covering portion for regulating the movement of the pannier 30 in the vehicle widthwise direction relative to the pannier stay 40. It is, however, to be noted that the covering portion referred to above may be provided in only one of the first inhibiting portion 60 and the second inhibiting portion 62.

The pannier stay 40 referred to above extends from the upper portion down to the lower portion of the pannier 30 in the vertical direction. The first retaining portion 48 of the pannier stay 40 extends from a front portion of the upper portion of the pannier 30 to the rear portion thereof in the longitudinal direction of the motorcycle. On the other hand, the second retaining portion 50 of the pannier stay 40 extends downwardly from the first retaining portion 48, and extends from a front portion of the lower portion of the pannier 30 to the rear portion thereof in the longitudinal direction of the motorcycle. Accordingly, since the pannier 30 is supported by the pannier stay 40 over the entire area in the vertical direction D1 and the longitudinal direction D2, the support of the pannier 30 is stabilized. Also, the front-rear dimension of the first retaining portion 48, which supports the load of the pannier 30, is larger than the front-rear dimension of the second retaining portion 50. Accordingly, the load imposed on the pannier 30 in the vertical direction can be easily dispersed and, hence, reduction in weight can be accomplished easily.

The front and rear walls 62a and 62b of the second retaining bag 62 and the branch portions 50a and 50a of the second retaining portion 50 extend parallel to each other. Accordingly, the movement of the pannier 30, in a condition inserted in the second retaining bag 62, in the vertical direction D1 can be guided by the front and rear walls 62a and 62b of the second retaining bag 62 and, therefore, the inserting work can be facilitated.

Since the connecting portion 46, extending in the vehicle widthwise direction, of the pannier stay 40 is provided between the first retaining portion 48 and the second retaining portion 50, the connecting portion 46 does not affect the mounting or removal of the pannier 30. Also, since the first retaining bag 60 is formed to represent a pocket-like shape, the front hem 48c and the rear hem 48d of the first retaining portion 48 are brought close to the front and rear walls 60b and 60c of the first retaining bag 60, respectively. Accordingly, in addition to the lower side second retaining portion 50 (second inhibiting portion), the movement in the longitudinal direction of the motorcycle can be suppressed even by the upper side first retaining portion 48.

A bent 75 is provided for fastening the first and second retaining portions 48 and 50 from the first direction D1, in the condition in which the first and second retaining portions 48 and 50 are respectively inserted into the second retaining bags 60 and 62. The belt 75 includes a stripe shaped band portion 75a and a fixture 75b provided in each end of the band portion 75a.

The opposite end portions of the band portion 75a of the belt 75 are fixed to the back surface 58 and, in a condition with the pannier 30 mounted on the pannier stay 40, a lower side (one end side) of the band portion 75a is folded upwardly from a lower end of the pannier stay 40 (the base portion 50b of the second retaining portion 50) so as to extend above the second covering member 68 of the second retaining bag 62 (inwardly of the second covering member 68 in the vehicle widthwise direction). On the other hand, an upper side (the other end side) of the band portion 75a is folded downwardly from an upper end of the first retaining bag 60 so as to extend above the first covering member 64 of the first retaining bag 60 (inwardly of the first covering member 64 in the vehicle widthwise direction) and then extend through a space S delimited by the first and second connecting portions 46a and 46b and the lower hem 48b of the first retaining portion 48. Thereafter, the mating tip end portions of the band portions 75a are fixed by the fixture 75b.

In the manner as described above, the second retaining bag 62 opens in the upper portion and also in the lower portion. Accordingly, rain water and dusts are not be poled in the second retaining bag 62. Also, since in the condition with the pannier 30 mounted on the pannier stay 40, the lower end portion (base portion 50b) of the second retaining portion 50 is exposed to the outside through the opening 74 in the lower portion of the second retaining bag 62, the lower end of the pannier stay 40 is supported by the belt 75 when the belt 75 is to be fastened. Hence, the support of the pannier 30 is stabilized.

When the pannier is mounted, the pannier stay 40 is covered by the pannier 30 from laterally outwards when viewed from lateral side. In other words, the pannier stay 40 is not exposed to lateral outwards. Accordingly, reduction of the aesthetic feature of the motorcycle is prevented. Also, since there is no need to render the pannier stay 40 to be a design component, the degree of freedom of designing of the pannier stay 40 can be increased. In particular, since the outer side surface of the pannier 30 is exposed when viewed from lateral side, making the pannier 30 as a design component is effective to increase the degree of setting freedom of a design.

In the description that follows, the procedure to mount the pannier 30 on the pannier stay 40 will be discussed. The left and right panniers 30 are separately mounted on the respective pannier stays 40. In other words, the left and right panniers 30 have their own independent mounting structures. Since the mounting procedures of the left and right panniers 30 are the same, reference is here made only to the right side pannier 30. At the outset, as shown by the arrow A1 in FIG. 6, the pannier 30 is moved to the other of the first direction D1 (upwardly) and, subsequently, the second retaining portion 50 of the pannier stay 40 is inserted into the second retaining bag 62 of the pannier 30 through the opening 72 in the upper portion (First inserting step). It is not possible to insert the first retaining portion 48 of the pannier stay 40 into the first retaining bag 60 at a timing preceding this first inserting step.

Thereafter, as shown by the arrow A2, the pannier 30 is moved in the one of the first direction D1 (downwards) and, subsequently, the first retaining portion 48 of the pannier stay 40 is inserted into the first retaining bag 60 of the pannier 30 through the opening 66 in the lower portion (Second inserting step). At this time the second retaining portion 50 is inserted within the second retaining bag 62 for movement up and down, and therefore, after the second retaining portion 50 is inserted into the second retaining bag 62 with the pannier 30 having been moved upwardly, the pannier 30 is moved downwardly to facilitate engagement of the first retaining portion 48 within the first retaining bag 60.

Finally, the opposite tip end portions of the band portion 75a of the belt 75 shown in FIG. 5 are fixed with the fixture 75b (Belt fixing step). In the manner described above, the pannier 30 is fixed to the pannier stay 40.

According to the above described construction, the pannier 30 is moved in the other of the first directions D1 (upwardly) and the second retaining portion 50 of the pannier stay 40 is subsequently engaged with the second retaining bag 62 of the pannier 30. Thereafter, the pannier 30 is moved in the one of the first direction D1 (downwardly) and the first retaining portion 48 of the pannier stay 40 is then engaged with the first retaining bag 60 of the pannier 30. By so doing, the pannier 30 can be easily fitted while the movement in the first and second directions D1 and D2 is inhibited. In addition, since the first and second retaining bags 60 and 62 are merely provided in the back surface 58 of the pannier 30, the structure is also simple. Since the downward movement of the pannier 30 is inhibited by the first retaining bag 60, an undesirable fall of the pannier 30 can be avoided.

Since the first and second retaining bags 60 and 62 are provided respectively with the first and second covering members 64 and 68 for covering the pannier stay 40 from the vehicle widthwise direction, the movement of the pannier 30 in the vehicle widthwise direction relative to the pannier stay 40 is restricted. Therefore, the pannier 30 can be fitted while the movement in the vehicle widthwise direction is inhibited, in addition to the first and second directions D1 and D2.

Also, the fitting of the pannier 30 is easily accomplished since all that are necessary are to insert the first and second retaining portions 48 and 50 into the first and second retaining bags 60 and 62, respectively. In addition, due to the two, first and second, retaining bags 60 and 62, the pannier 30 is supported over the entire back surface 58 of the pannier 30 and, therefore, the support of the pannier 30 is stabilized.

Also, the second retaining portion 50 is displaced in the second direction D2 relative to the first retaining portion 48, and the second retaining bag 62 is displaced in the second direction D2 relative to the first retaining bag 60. Accordingly, since only the right side pannier 30 can be fitted to the right side pannier stay 40, an erroneous mix-up of the left and right panniers 30 can be avoided.

Yet, while the first and second retaining portions 48 and 50 are inserted respectively in the first and second retaining bags 60 and 62, the first and second retaining portions 48 and 50 are fastened from the first direction D1 by the belt 75. Accordingly, the movement of the pannier 30 in the first direction D1 is regulated. In addition, since the belt 75 is used to fasten the pannier stay 40 and the first and second retaining bags 60 and 62 together, the movement of the pannier 30 in the vehicle widthwise direction relative to the pannier stay 40 can also be inhibited. In particular, with the belt 75 fastened over the upper and lower first and second retaining bags 60 and 62, the movement of the pannier 30 in the vehicle widthwise direction can be refrained by both of the first and second retaining bags 60 and 62.

Since the upper first retaining portion 48 represents the parallelogram shape having rounded corners, damage to the first retaining bag 60 can be avoided. Specifically, if an upper side of the pannier stay 40 is so made as to represent a four sided shape, a straight portion (upper hem of the first retaining portion 48) 48a lies on an upper side and the surface pressure of an upper hem portion of the first retaining bag 60 that contacts the pannier stay 40 will become uniform. Therefore, even though it is loaded with a load acting in the vertical direction as a result of vibration during the travelling, the first retaining bag 60 will resist to breakage.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, the pannier 30 may not be a soft casing and may be a hard casing.

Also, the pannier stay 40 may be provided on the side of the pannier 30 and the opposing member 69 may then be provided on the side of the vehicle body.

Further, although in describing the preferred embodiment of the present invention, the vertical direction has been shown and described as the first directions D1, it may be the longitudinal direction of the motorcycle.

Yet, the pannier mounting structure hereinabove described in connection with the present invention may be applied not only to the motorcycle, but also to any other saddle-riding type vehicle such as, for example, a three wheeled vehicle or a four wheeled buggy.

Accordingly, such changes and modifications are, unless they depart from the scope of the present invention as delivered from the claims annexed hereto, to be construed as included therein.

REFERENCE NUMERALS

30 . . . Pannier
40 . . . Pannier stay
48 . . . First retaining portion
50 . . . Second retaining portion
60 . . . First retaining bag (First inhibiting portion)
62 . . . Second retaining bag (Second inhibiting portion)
64 . . . First covering member (Covering portion)
68 . . . Second covering member (Covering portion)
69 . . . Opposing member
75 . . . Belt
D1 . . . First direction (Vertical direction)
D2 . . . Second direction (Front-rear direction)

What is claimed is:

1. A pannier mounting structure for a saddle-riding type vehicle for fitting a pannier to a side portion in a vehicle widthwise direction of a vehicle body, which structure comprises:
   a stay provided in one of the pannier and the vehicle body; and
   an opposing member provided in the other of the pannier and the vehicle body, the opposing member confronting the stay in the vehicle widthwise direction, wherein:
   the stay includes a first retaining portion on one side in a first direction and a second retaining portion on the other side in the first direction;
   the opposing member includes a first inhibiting portion and a second inhibiting portion;
   the first inhibiting portion is engaged with the first retaining portion of the stay to inhibit a relative movement of the pannier relative to the vehicle body towards the one side in the first direction on a plane crossing the vehicle widthwise direction;
   the second inhibiting portion is engaged with the second retaining portion of the stay to permit a movement in the first direction but to inhibit the relative movement of the pannier relative to the vehicle body in a second direction transverse to the first direction;
   the first inhibiting portion and the second inhibiting portion are disposed spaced from each other in the first direction on the plane crossing the vehicle widthwise direction; and
   in a condition in which the relative movement of the pannier in the second direction relative to the vehicle body is inhibited by the second inhibiting portion, and in a condition in which the pannier is moved towards the other side in the first direction relative to the vehicle body, the stay is spaced from the first inhibiting portion in the first direction so as to assume a position adjacent to the second inhibiting portion.

2. The pannier mounting structure for the saddle-riding type vehicle as claimed in claim 1, wherein:
   the first inhibiting portion inhibits downward movement of the pannier relative to the vehicle body;
   the second inhibiting portion inhibits movement of the pannier relative to the vehicle body in a longitudinal direction of the vehicle body;
   at least one of the first inhibiting portion and the second inhibiting portion includes a covering portion covering the stay from the vehicle widthwise direction, the covering portion regulating movement of the pannier in the vehicle widthwise direction relative to the stay; and
   the second inhibiting portion is, in a condition in which the relative movement of the pannier in the longitudinal direction relative to the vehicle body is inhibited, so configured as to permit the pannier to be relatively movable upwardly relative to the vehicle body and, in a condition in which the pannier is moved to an uppermost end relative to the vehicle body, the stay and the first inhibiting portion are spaced from each other in a vertical direction.

3. The pannier mounting structure for the saddle-riding type vehicle as claimed in claim 1, wherein:

The opposing member includes one side surface, facing the vehicle widthwise direction, provided with a first retaining bag and a second retaining bag positioned on the other side of the first direction of the first retaining bag, the first retaining bag opening in the other side of the first direction and forming the first inhibiting portion, the second retaining bag opening in the one of the first direction and forming the second inhibiting portion; and in a condition in which the first retaining portion is inserted into the first retaining bag through an opening on the other side of the first direction, the second retaining portion is inserted into the second retaining bag through an opening on the one side of the first direction and is then engaged within the second retaining bag.

4. The pannier mounting structure for the saddle-riding type vehicle as claimed in claim 3, wherein:

the second retaining portion is displaced in the second direction relative to the first retaining portion; and the second retaining bag is displaced in the second direction relative to the first retaining bag.

5. The pannier mounting structure for the saddle-riding type vehicle as claimed in claim 3, further comprising a belt configured to fasten the first and second retaining portions from the first direction during a condition in which the first and second retaining portions are inserted in the first and second retaining bags, respectively.

6. A saddle-riding type vehicle provided with the pannier mounting structure as defined in claim 1.

7. A pannier which is fitted to a side portion in a vehicle widthwise direction of a saddle-riding type vehicle through a stay, which stay includes a first retaining portion on one side in a first direction and a second retaining portion on the other side in the first direction, the pannier comprising:

one side surface in the vehicle widthwise direction provided with an opposing member which confronts the stay, wherein:

the opposing member includes a first inhibiting portion and a second inhibiting portion;

the first inhibiting portion is engaged with the first retaining portion of the stay to inhibit a relative movement of the pannier relative to the vehicle body towards the one side in the first direction on a plane crossing the vehicle widthwise direction;

the second inhibiting portion is engaged with the second retaining portion of the stay to permit a movement in the first direction but to inhibit the relative movement of the pannier relative to the vehicle body in a second direction transverse to the first direction;

the first inhibiting portion and the second inhibiting portion are disposed spaced from each other in the first direction on the plane crossing the vehicle widthwise direction; and in a condition in which the relative movement of the pannier in the second direction relative to the vehicle body is inhibited by the second inhibiting portion, and in a condition in which the pannier is moved towards the other side in the first direction relative to the vehicle body, the stay is spaced from the first inhibiting portion in the first direction so as to assume a position adjacent to the second inhibiting portion.

\* \* \* \* \*